US010650488B2

(12) United States Patent
Harviainen et al.

(10) Patent No.: US 10,650,488 B2
(45) Date of Patent: May 12, 2020

(54) APPARATUS, METHOD, AND COMPUTER PROGRAM CODE FOR PRODUCING COMPOSITE IMAGE (71) Applicant: Teknologian tutkimuskeskus VTT Oy, Espoo (FI)

(72) Inventors: Tatu Harviainen, Espoo (FI); Charles Woodward, Espoo (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 0 days.

(21) Appl. No.: 16/324,658

(22) PCT Filed: Aug. 10, 2017

(86) PCT No.: PCT/FI2017/050567
§ 371 (c)(1),
(2) Date: Feb. 11, 2019

(87) PCT Pub. No.: WO2018/029399
PCT Pub. Date: Feb. 15, 2018

(65) Prior Publication Data
US 2019/0220954 A1 Jul. 18, 2019

(30) Foreign Application Priority Data

Aug. 11, 2016 (FI) .................................. 20165612

(51) Int. Cl.
G06T 3/00 (2006.01)
G06T 15/50 (2011.01)
(Continued)

(52) U.S. Cl.
CPC .......... G06T 3/0093 (2013.01); G06K 9/3233 (2013.01); G06T 3/0006 (2013.01);
(Continued)

(58) Field of Classification Search
CPC ... G06T 3/0006; G06T 3/0093; G06T 3/4007; G06T 3/4038; G06T 5/002; G06T 5/003;
(Continued)

(56) References Cited

U.S. PATENT DOCUMENTS 6,266,068 B1 * 7/2001 Kang ..................... G06T 11/60
345/422
2002/0061131 A1 * 5/2002 Sawhney ............... G06T 15/205
382/154

(Continued)

FOREIGN PATENT DOCUMENTS

WO 2009/091563 7/2009
WO 2010/116329 10/2010

OTHER PUBLICATIONS

Author: Sinkel, Title: User Guide for Picture Window and Picture Window Pro, Date: Feb. 24, 2016, source: http://www.dl-c.com/Temp/downloads/Whitepapers/PW70.pdf (Year: 2016).*

(Continued)

Primary Examiner — Jwalant Amin
(74) Attorney, Agent, or Firm — Nixon & Vanderhye PC (57) ABSTRACT Apparatus, method, and computer program code for producing composite image. A method comprises: obtaining (150) a first image (130) with first depth information; obtaining (152) a second image (132) with second depth information; detecting (154) regions of interest in the first image (130); segmenting (156) the regions of interest into individual layers; performing (158) image compensation for the individual layers according to the first depth information so that in image compensated individual layers a perspective and/or a viewpoint of the first image (130) is modified to be more similar with the second image (132); and rendering (160) the image compensated individual layers with the second image (132) utilizing the first depth information and the second (Continued)

depth information in order to produce a composite image (134).

20 Claims, 7 Drawing Sheets

(51) Int. Cl.
    *G06T 3/40*     (2006.01)
    *G06T 5/50*     (2006.01)
    *G06T 7/11*     (2017.01)
    *G06T 7/593*     (2017.01)
    *G06K 9/32*     (2006.01)
    *G06T 5/00*     (2006.01)

(52) U.S. Cl.
    CPC .......... *G06T 3/4007* (2013.01); *G06T 3/4038* (2013.01); *G06T 5/002* (2013.01); *G06T 5/003* (2013.01); *G06T 5/50* (2013.01); *G06T 7/11* (2017.01); *G06T 7/593* (2017.01); *G06T 15/503* (2013.01); *G06T 2207/10028* (2013.01); *G06T 2207/20132* (2013.01); *G06T 2207/20221* (2013.01)

(58) Field of Classification Search
    CPC ... G06T 5/50; G06T 7/11; G06T 7/593; G06T 15/503; G06T 2207/10028; G06T 2207/20132; G06T 2207/20221; G06K 9/3233
    See application file for complete search history.

(56) References Cited

U.S. PATENT DOCUMENTS

| | | |
|---|---|---|
| 2003/0218615 A1 | 11/2003 | Gelb |
| 2006/0291697 A1* | 12/2006 | Luo .................... G06K 9/00369 382/104 |
| 2010/0128121 A1 | 5/2010 | Wilkinson |
| 2011/0216160 A1 | 9/2011 | Martin |
| 2012/0115598 A1 | 5/2012 | Hagstroem et al. |
| 2013/0314561 A1 | 11/2013 | Balannik et al. |
| 2015/0091900 A1 | 4/2015 | Yang et al. |

OTHER PUBLICATIONS

International Search Report for PCT/FI2017/050567, dated Nov. 13, 2017, 5 pages.
Written Opinion of the ISA for PCT/FI2017/050567, dated Nov. 13, 2017, 8 pages.
Search Report for FI20165612, dated Mar. 9, 2017, 2 pages.
Tian et al., "Real-Time Occlusion Handling in Augmented Reality Based on an Object Tracking Approach", *Sensors*, vol. 10, No. 4, Mar. 29, 2010, pp. 2885-2900.
Shade et al., "Layered Depth Images", In Proceedings of the 25th Annual conference on Computer graphics and interactive techniques (SIGGRAPH 98), 1998, pp. 231-242.
Pearson et al., "Plenoptic Layer-Based Modeling for Image Based Rendering", IEEE Transactions on Image Processing, 2013, vol. 22, No. 9, pp. 3405-3419.
[Online], "Selfie wall makes viewer part of photo or outdoor advert", Publication time: May 26, 2016, 3 pages.

* cited by examiner

APPARATUS, METHOD, AND COMPUTER PROGRAM CODE FOR PRODUCING COMPOSITE IMAGE

This application is the U.S. national phase of International Application No. PCT/FI2017/050567 filed Aug. 10, 2017 which designated the U.S. and claims priority to FI Patent Application No. 20165612 filed Aug. 11, 2016, the entire contents of each of which are hereby incorporated by reference.

FIELD

The invention relates to an apparatus, method, and computer program code for producing a composite image.

BACKGROUND

In several use cases it is desirable to be able to capture a person with a camera, and visualize him/her as a part of completely different scene. One example of such use case is a meteorologist captured in front of green screen and digital weather map, both of which are composited together in real-time for TV broadcasting. Current solutions for composting different image sources together in real-time only work well when perspective and viewpoint of the different image sources are nearly identical. This significantly restricts the types of visual material which can be mixed together, thus limiting the use cases and experiences which can be provided.

Current solutions are done with a chroma keying approach: elements to be composited are captured in front of a distinctively colored background such as green or blue cloth, which is then easy to segment and remove from the captured image. In an alternative approach, direct background subtraction is used with the assumption that elements are captured in front of a static background. Static background and dynamic element may be separated according to the temporal nature of the pixels. To simplify, in background subtraction, pixels that represent objects of interest change over time whereas pixels representing background remain static. Both chroma keying and background subtraction work only well for composition to other image sources that have very similar perspective and viewpoint, and occlusions between image sources are ignored.

There are attempts to improve real-time composition with the use of RGB-D sensors. The approach in these examples is quite different: the solution is based on capturing RGB-D sensor data, using it to reconstruct full 3D model of the elements seen by the sensor, and then rendering reconstructed 3D elements from different viewpoint. These solutions tend to suffer from technical complexity, as several RGB-D sensors are needed in order to achieve complete enough 3D reconstruction to allow changing of the viewpoint. Also, the image quality resulting from 3D rendering of reconstructed 3D model tends to be sub-optimal compared with the image quality achieved by using the data captured by the RGB camera of the RGB-D sensor alone.

BRIEF DESCRIPTION

The present invention seeks to provide an improved apparatus, method, and computer program code for producing a composite image.

According to an aspect of the present invention, there is provided an apparatus as specified in claim 1.

According to another aspect of the present invention, there is provided a method as specified in claim 11.

According to another aspect of the present invention, there is provided computer program code as specified in claim 12.

LIST OF DRAWINGS

Example embodiments of the present invention are described below, by way of example only, with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
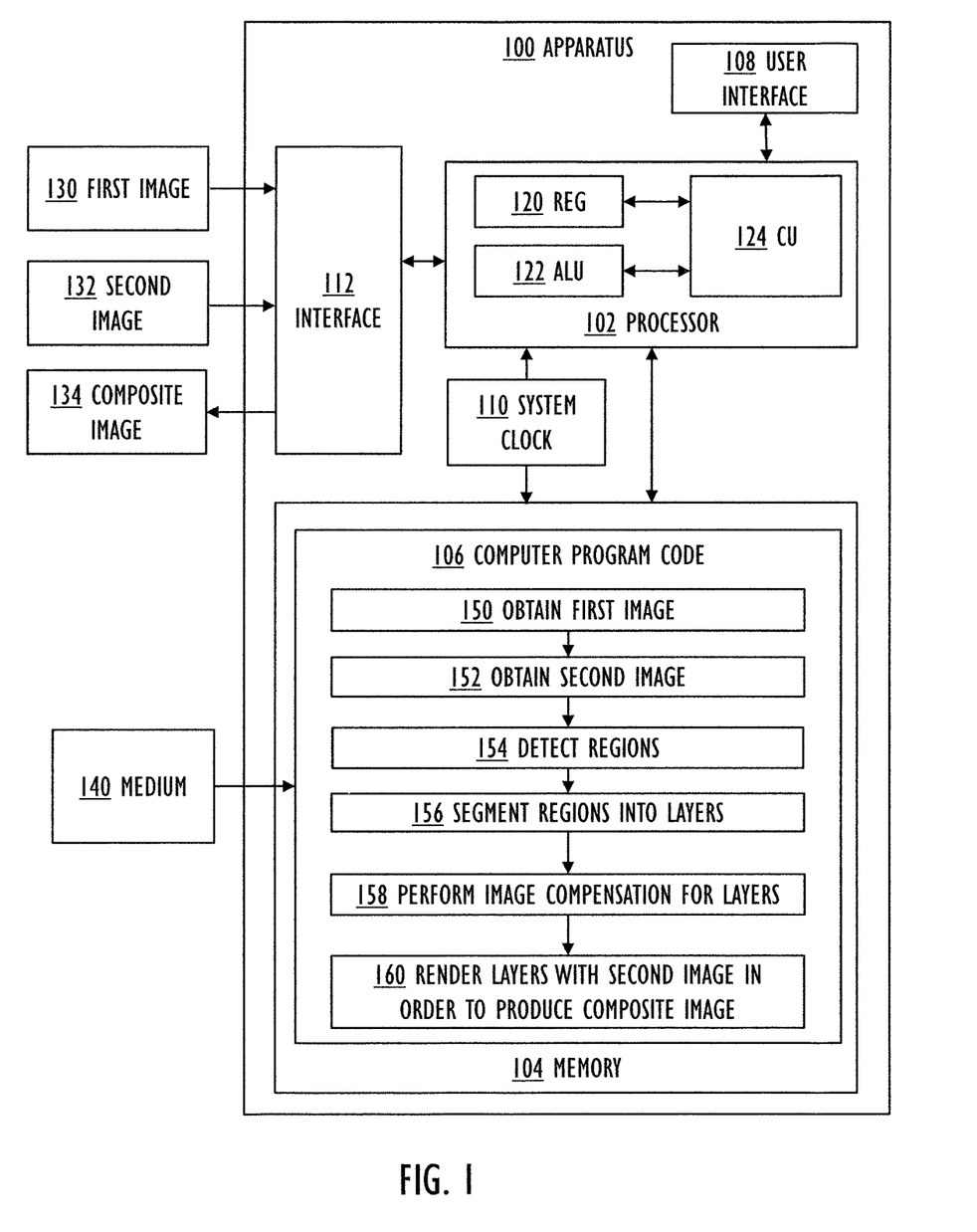
FIG. 1 illustrates example embodiments of an apparatus.
Figure 2:
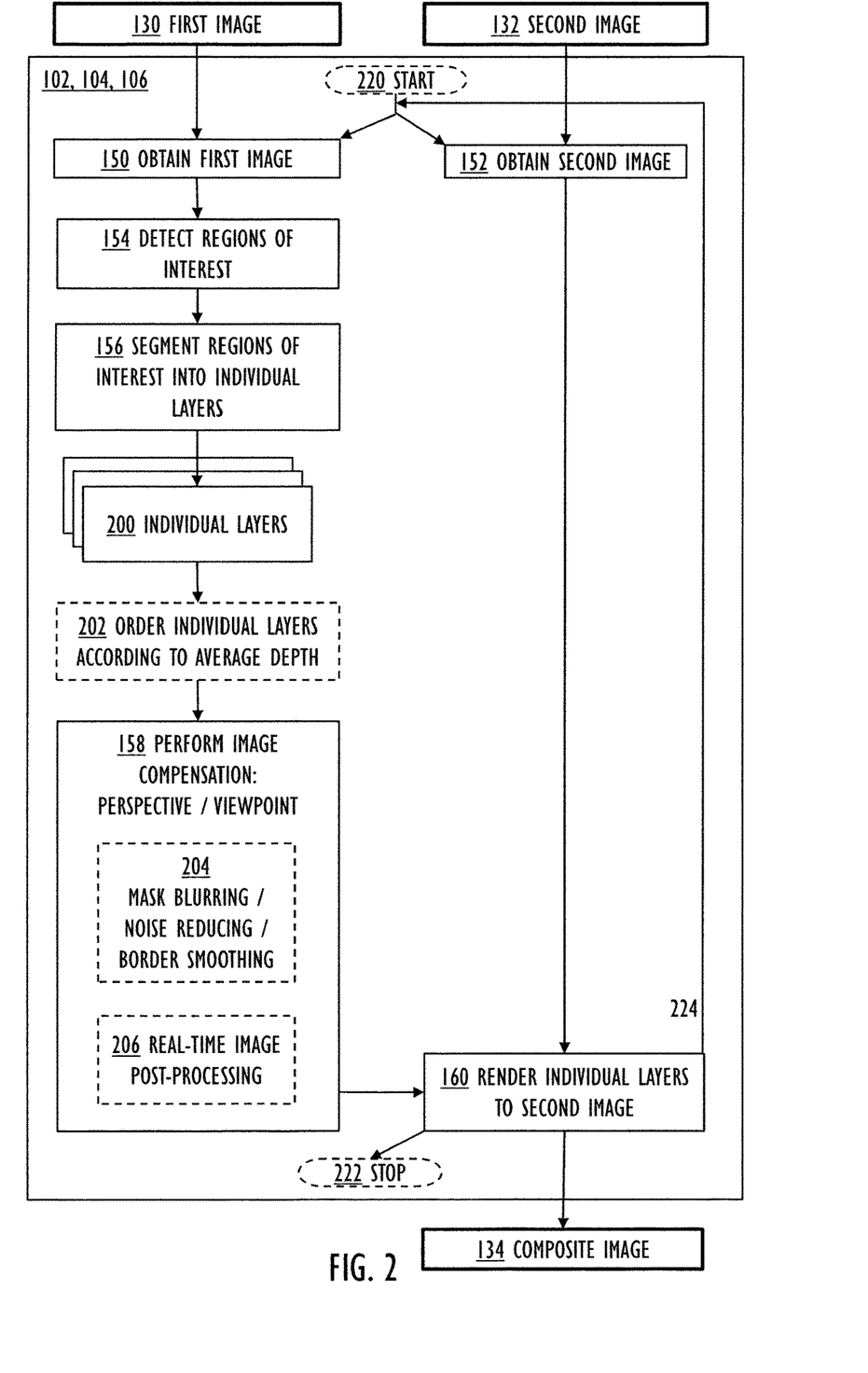
FIG. 2 illustrates further example embodiments.

FIG. 1 illustrates example embodiments of an apparatus 100, and FIG. 2 example embodiments of the full processing pipeline.

It should be noted that while FIG. 1 illustrates various embodiments of the apparatus 100, it is a simplified block diagram that only shows some structures and functional entities. The connections shown in FIG. 1 are logical connections; the actual physical connections may be different. It is apparent to a person skilled in the art that the described apparatus 100 may also comprise other functions and structures. It should be appreciated that details of some functions, structures, and the protocols used for communication are irrelevant to the actual invention. Therefore, they need not be discussed in more detail here.

In an example embodiment, the apparatus 100 may be a digital image processing apparatus or a part of a digital image processing apparatus. The apparatus 100 may operate according to a specific image processing standard. Such apparatus 100 may be a computer, a laptop, a portable electronic processing apparatus, a mobile apparatus, a mobile phone, a smartphone, a tablet computer, a phablet, a smartwatch, a general-purpose mobile computing device. In an example embodiment, the apparatus 100 is a general-purpose off-the-shelf computing device, as opposed to a purpose-build proprietary equipment, whereby research & development costs will be lower as only the special-purpose software (and not the hardware) needs to be designed, implemented and tested. The apparatus 100 may or may not comprise a digital camera. However, the apparatus 100 is not limited to these examples, but it may be embedded in any electronic equipment where the described processing may be implemented.

In an example embodiment, the apparatus 100 may be a computing resource implemented as a single server computer or as a cluster of computers. In an example embodiment, the apparatus 100 may also operate according to the cloud computing model, at least in part. Naturally, besides these example embodiments of the computing resource 100, other feasible computing architectures may be utilized as well to implement the hardware and software of the apparatus 100.

The apparatus 100 comprises one or more processors 102, and one or more memories 104 including computer program code 106.

The term 'processor' 102 refers to a device that is capable of processing data. Depending on the processing power needed, the apparatus 100 may comprise several processors 102 such as parallel processors or a multicore processor. When designing the implementation of the processor 102, a person skilled in the art will consider the requirements set for the size and power consumption of the apparatus 100, the necessary processing capacity, production costs, and production volumes, for example. The processor 102 and the memory 104 may be implemented by an electronic circuitry.

The term 'memory' 104 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

The computer program code 106 may be implemented by software and/or hardware. In an example embodiment, the software may be written by a suitable programming language, and the resulting executable code 106 may be stored on the memory 104 and run by the processor 102. In an alternative example embodiment, the functionality of the hardware may be designed by a suitable hardware description language (such as Verilog or VHDL), and transformed into a gate-level netlist (describing standard cells and the electrical connections between them), and after further phases the chip implementing the processor 102, memory 104 and the code 106 of the apparatus 100 may be fabricated with photo masks describing the circuitry.

In an example embodiment, a system clock 110 constantly generates a stream of electrical pulses, which cause the various transferring operations within the apparatus 100 to take place in an orderly manner and with specific timing.

In an example embodiment, the processor 102 may be implemented as a microprocessor implementing functions of a central processing unit (CPU) on an integrated circuit. The CPU is a logic machine executing the computer program code 106. The computer program code 106 may be coded as a computer program using a programming language, which may be a high-level programming language, such as C, C++, or Java, or a low-level programming language, such as a machine language, or an assembler, for example. The CPU may comprise a set of registers 120, an arithmetic logic unit (ALU) 122, and a control unit (CU) 124. The control unit 124 is controlled by a sequence of the computer program code 106 transferred to the CPU from the (working) memory 104. The control unit 124 may contain a number of microinstructions for basic operations. The implementation of the microinstructions may vary, depending on the CPU design. The microprocessor 102 may also have an operating system (a dedicated operating system of an embedded system, a real-time operating system, or even a general-purpose operating system), which may provide the computer program code 106 with system services.

A non-exhaustive list of implementation techniques for the processor 102 and the memory 104 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

In an example embodiment, the processor 102 and the memory 104 are separate entities, communicatively coupled together by an appropriate serial bus, for example. In general interfaces between the various elements may be implemented with suitable interface technologies, such as a message interface, a method interface, a sub-routine call interface, a block interface, an appropriate serial/parallel bus, or any hardware/software means enabling communication between various sub-units of the apparatus 100.

An example embodiment provides a computer-readable storage medium 140 comprising the computer program code 106 which, when loaded into the apparatus 100 causes the apparatus 100 to implement the described example embodiments.

The example embodiments of the apparatus 100 may be used to enhance the operation of the computer program code 106. There are many ways to structure the computer program code 106. In an example embodiment, the operations of the computer program code 106 may be divided into functional modules, sub-routines, methods, classes, objects, applets, macros, etc., depending on the software design methodology and the programming language used. In modern programming environments, there are software libraries, i.e. compilations of ready-made functions, which may be utilized by the computer program code 106 for performing a wide variety of standard operations. In an example embodiment, the computer program code 106 may be in source code form, object code form, executable file, or in some intermediate form. The computer-readable medium 140 may comprise at least the following: any entity or device capable of carrying computer program code 106 to the apparatus 100, a record medium, a computer memory, a read-only memory, an electrical carrier signal, a telecommunications signal, and a software distribution medium. In some jurisdictions, depending on the legislation and the patent practice, the computer-readable medium 140 may not be the telecommunications signal. In an example embodiment, the computer-readable medium 140 may be a non-transitory computer-readable storage medium.

The one or more memories 104 and the computer program code 106 are configured to, with the one or more processors 102, cause the apparatus 100 at least to perform the following six operations:

150) Obtain a first image 130 with first depth information.

152) Obtain a second image 132 with second depth information.

154) Detect regions of interest in the first image 130.

156) Segment the regions of interest into individual layers 200.

158) Perform image compensation for the individual layers 200 according to the first depth information (associated with the individual layer) so that in image compensated individual layers 200 a perspective and/or a viewpoint of the first image 130 is modified to be more similar with the second image 132.

160) Render the image compensated individual layers 200 with the second image 132 utilizing the first depth information and the second depth information in order to produce a composite image 134.

In an example embodiment, the first image 130 and/or the second image 132 may be obtained locally from a camera, file, message, data communication interface, memory device, or some other input media, or obtained from a remote location with a wired and/or wireless communication network.

In an example embodiment, the composite image 134 may be outputted locally to a file, message, data communication interface, memory device, printer, display or some other output media, or transmitted with a wired and/or wireless communication network to a remote location for storage/output.

The goal of the described image processing is to merge two source images 130, 132 together into a composite image 134, so that occlusions, perspective and image quality are consistent across the composite image 134 resulting from mixing of two different source images 130, 132.

In an example embodiment, the first image 130 comprises for each pixel RGB color model levels and depth values.

Figure 3:
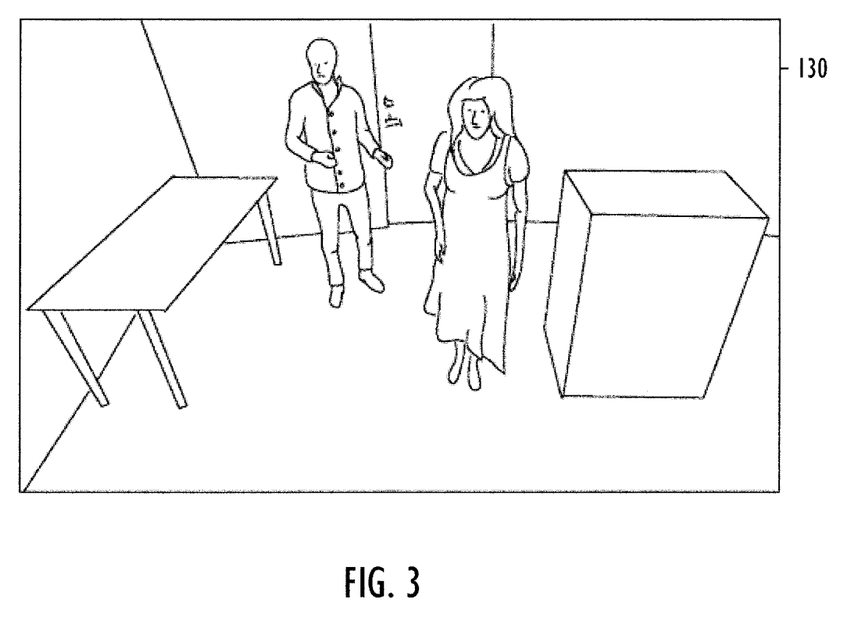
FIGS. 3 and 4 illustrate source images.
Figure 4:
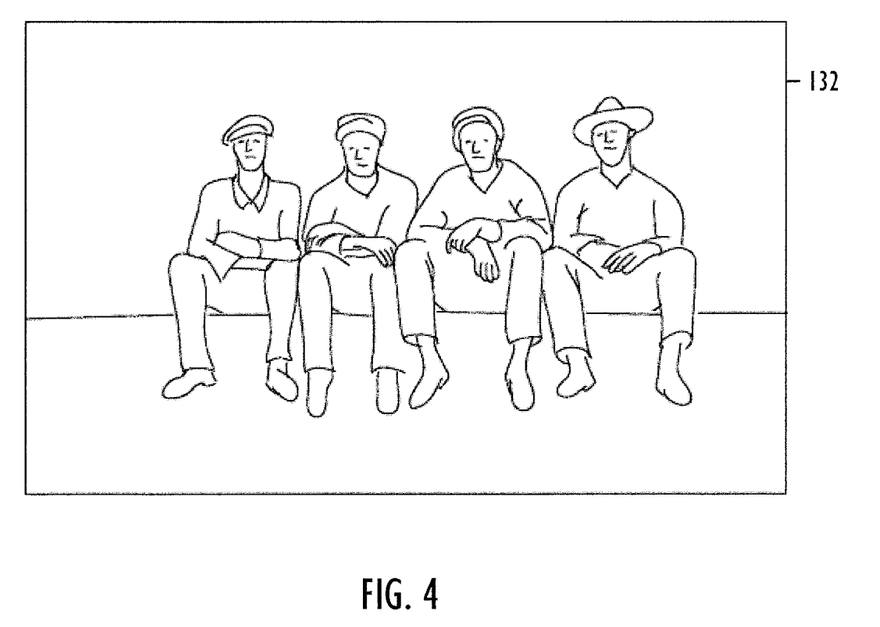
Figure 10:
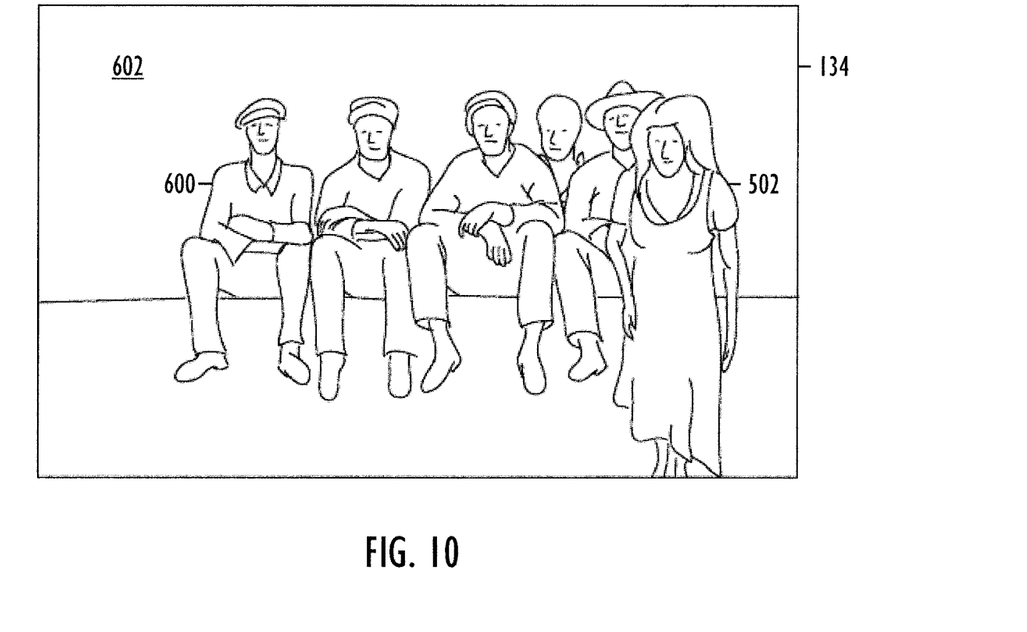
FIG. 10 illustrates a composite image.

In an example embodiment, as a starting point, the process has two separate image sources 130, 132 both of which provide RGB image and associated depth data as an input. FIGS. 3, 4 and 10 illustrate two input sources 130, 132 and desired resulting image 134 where selective parts of image sources 130, 132 have been composited together.

Further example embodiments of the process performing the composition are illustrated in FIG. 2.

Figure 5:
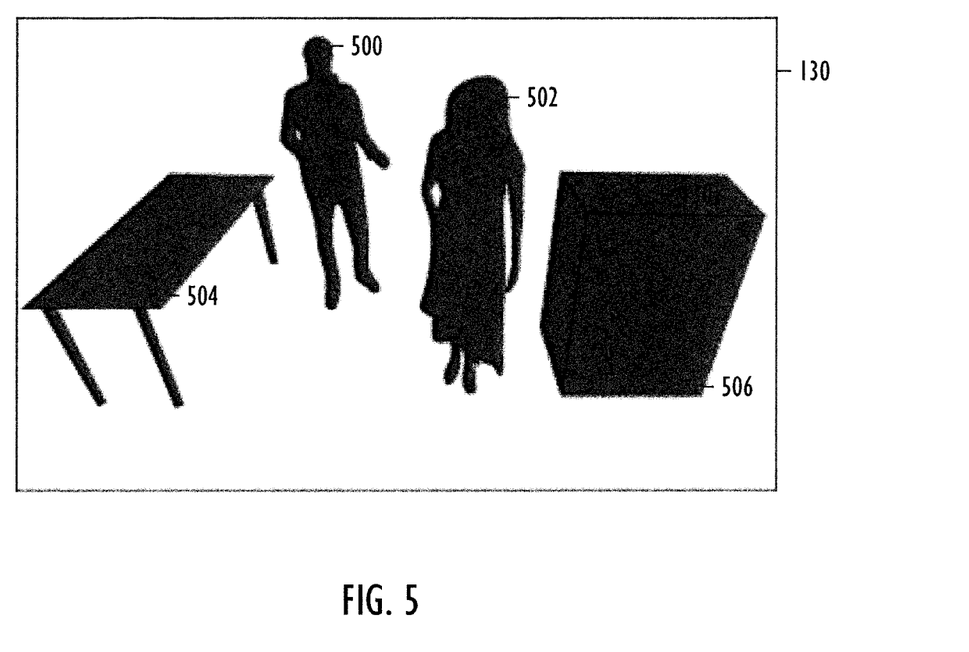
FIG. 5 illustrates detected regions of interest.

In an example embodiment, illustrated in FIG. 5, regions of interest 500, 502, 504, 506 are parts of the first image 130 that represent elements that are desired to be isolated and composited to the final image 134.

In an example embodiment of a use case, a goal is to detect and isolate humans from the RGB-D sensor data. For detection and segmenting of the desired elements, any known solution may be used. For example, Kinect V2 SDK provides features for requesting detection of humans (called "players" in the SDK) 500, 502 from the sensor data. However, region of interest may be any object or element in the sensor data, which may be detected and isolated and may vary from use case to use case. In FIG. 5, the regions of interest are humans 500, 502, and pieces 504, 506 of furniture.

When the region of the interest 500, 502, 504, 506 have been detected, each individual element may be isolated. In an example embodiment, for this purpose, detected elements 500, 502, 504, 506 are segmented and isolated into individual segment layers 200.

In an example embodiment, the segmentation 156 comprises: crop a minimum bounding box area surrounding the region of the interest 500, 502, 504, 506 with a binary mask layer, which defines pixels of the bounding box area as either belonging to the region of the interest 500, 502, 504, 506 or to a background or an occluding object.

In an example embodiment, the cropped area provides a minimum RGB image covering the visible area of the detected element and binary mask layer, which defines which of the pixels of the bounding box area contain pixels of the element to be composited (TRUE), and which pixels are background or occluding objects (FALSE). In an example embodiment using Microsoft® Kinect® V2 SDK, a mask may be provided with mask values labeling individual detected players. When isolating segments into the layers 200, player mask information may be transformed into binary mask by turning pixels not representing same player as is being cropped as false and pixels representing player, which is cropped to be in the isolated layer, as true.

In an example embodiment, the segmentation 156 comprises: order 202 the individual layers 200 according to their average first depth information.

In an example embodiment, the average depth of the layer 200 is calculated by averaging values of all depth pixels on the corresponding area of the TRUE values in the binary mask layer of the layer 200. In an example embodiment, when the layers 200 are rendered 160, the rendering 160 may be done according to the depth values of the layers 200, starting from the layer representing elements most far away from the sensor to the layer representing the element closest to the sensor.

Figure 6:
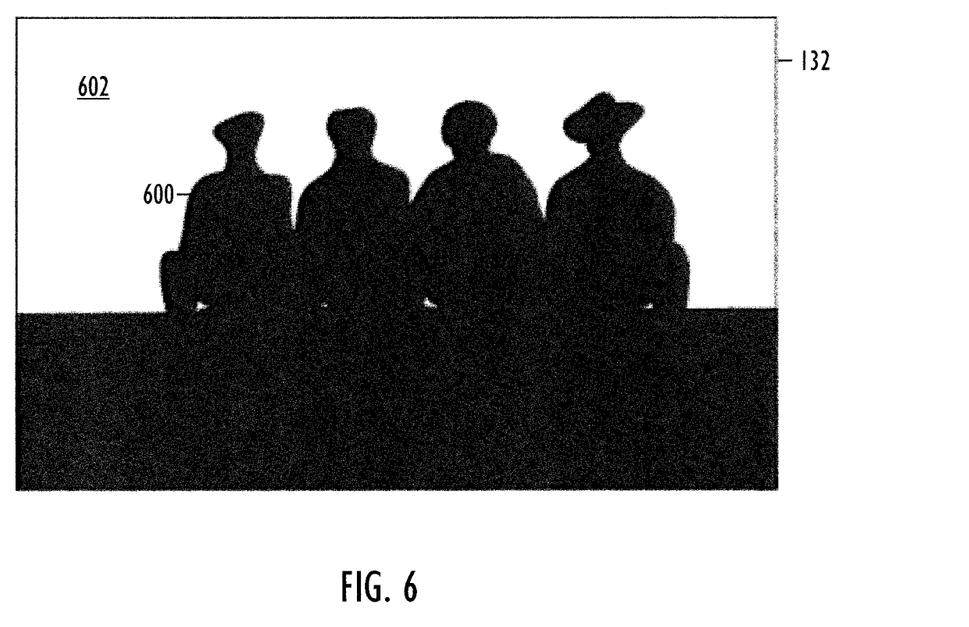
FIG. 6 illustrates depth layers.

In an example embodiment, illustrated in FIG. 6, depth layers are defined by a user operation for the second image 132: a layer 600 of humans sitting on an object, and a layer 602 depicting a background.

In an example embodiment, the image compensation 158 comprises: perform an image warping for the individual layers 200 so that a tilting of a geometry of the first image 130 is modified to be more similar with a tilting of a geometry of the second image 132, and perform a gradient depth correction for the individual layers 200 so that a correction value is added to the first depth information in order to gradually change according to a direction of the image warping.

In cases where the camera's point of view, i.e., angle towards the targets or objects in scenes, has variation between different image sources, differing viewpoints may be compensated to a degree with image warping. The warping may be performed to the whole image area in a one go, or it may be defined for each individual segment layer according to the segment location. In approach where 3D rendering is used for compositing, 3D geometry (textured quads) used for segment rendering may be directly translated according to the viewpoint variation for efficient implementation. Image warping done on the image plane for individual segments or for the whole image area may be quite processing intensive operation.

Figure 7:
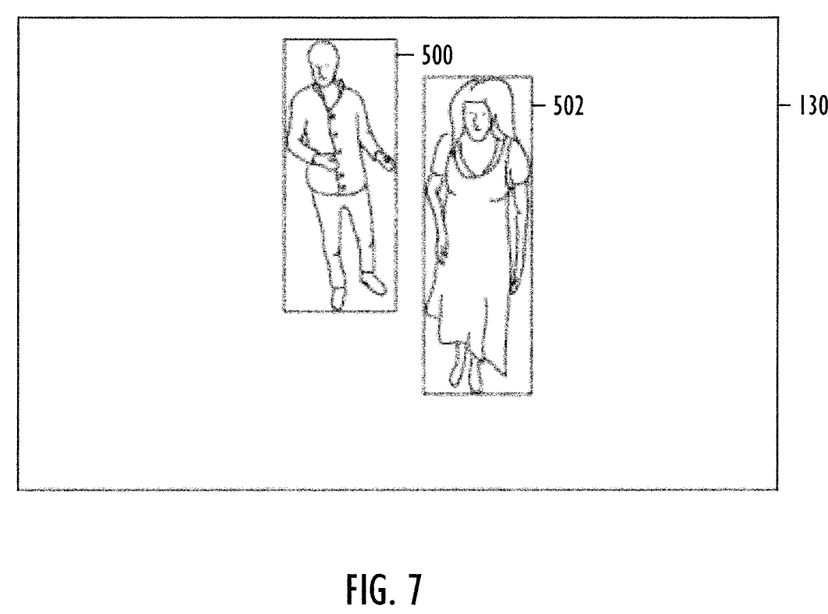
FIG. 7 illustrates segmented individual layers.
Figure 8:
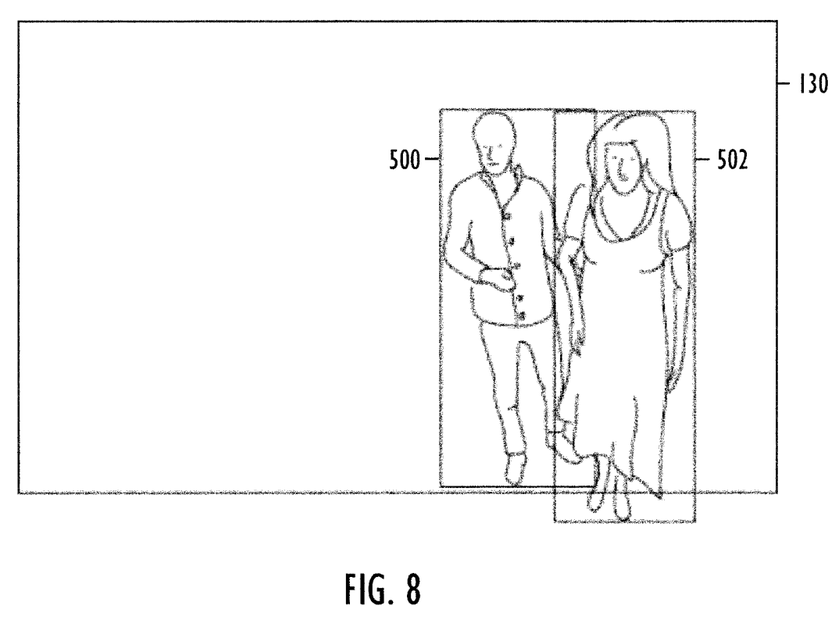
FIG. 8 illustrates perspective compensation.

In an example embodiment, viewpoint compensation is performed by non-uniform scaling of image as illustrated in FIGS. 7 and 8. Warping compensates for the tilting of the geometry, which is typically visible when changing camera angle for example from low to high angle. This approach may compensate geometry tilting seen on the RGB-D sensor image 130 to be more similar to the geometry tilting seen on the other visual source 132. In an example embodiment, the amount and direction of the required warping may be defined by a user operation by approximating the difference between viewpoint angles in image sources 130, 132.

In an example embodiment, the image compensation 158 comprises: perform a scaling and translation for the individual layers 200 so that their distance from a camera that produced the first image 130 is adjusted to match a perspective of the second image 132.

In an example embodiment, the scaling and translation comprises: define the nearest individual layer 200 and the farthest individual layer 200 with a user operation or according to a field of view of the camera that produced the first image 130, and define for each individual layer 200 the scaling and translation by interpolating scaling and translation values according to the distances between the individual layers 200.

In addition to the RGB image, also depth information may be compensated. As depth data may be considered to represent 3D positions, depth data may be corrected by applying a 3D transformation. Alternative approach is to compensate depth data similar to the RGB image, i.e. perform image plane warping similar to the RGB image to the gray scale image representing the depth values. In this approach, in addition to the image warping, depth values are compensated by adding gradient depth correction value to all depth values of the RGB-D data. Gradient depth correction works by adding a correction value to depth values which gradually changes according to the image warp direction, e.g. increasing every row from top row of the image pixel data to bottom row in case when the warp is done as seen in the FIGS. 7 and 8. Adding this gradually changing value causes depth values to align according to the compensated viewpoint. Without adding gradient depth correction all depth values may feature an erroneous tilting, since the values match the measures from the original viewpoint, not from the viewpoint achieved with the compensation.

Camera lens optics define the resulting perspective, which in turn affects how object's distance from the lens causes the object to diminish in size and translate on image plane. Different optics provide different perspectives, which is visible in resulting image in the field of view seen by the camera and amount of object translation and scaling depending on the distance from the camera.

In an example embodiment, variation between perspective of RGB-D sensor and camera perspective used for capturing the material to which RGB-D data is to be composited to, may be compensated to a degree by scaling and translation of individual layers 200 according to their average distance from the RGB-D sensor.

Required scaling and translation amounts may be defined by a user operation as required X and Y axis translations at the near end of the visible distance for the RGB-D sensor and far end of the visible distance seen by the RGB-D sensor. Per layer translation and scaling used for each individual layer 200 is defined by interpolating scaling and translation values according to the layer distance.

Near and far translation values may be defined by a user operation according to the approximated perspective of the image source to which RGB-D data is to be composited to, or calculated according to the camera field of views if both RGB-D camera and other image source camera field of views are known.

Figure 9:
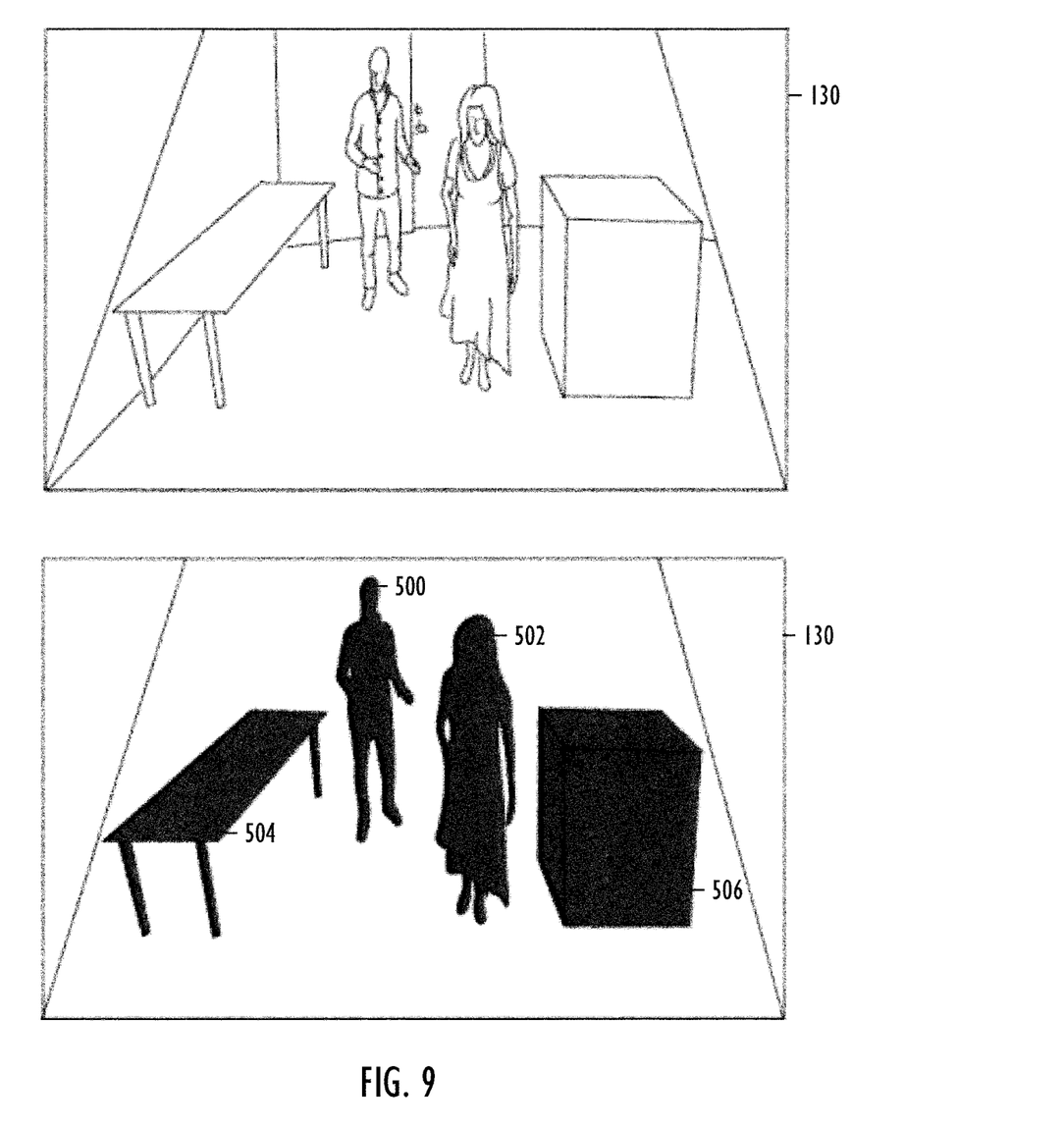
FIG. 9 illustrates viewpoint compensation.

FIGS. 7 and 8 illustrate an example perspective correction performed to two individual segment layers 500, 502 isolated from the RGB-D data. FIG. 9 illustrates the first image 130 after the image compensation 158, and the individual layers 500, 502, 504, 506 after the image compensation 158.

In an example embodiment, the image compensation 158 comprises: perform 204 mask blurring and/or noise reducing filtering and/or border smoothing filtering for the individual layers 200.

In an example embodiment, the image compensation 158 comprises: perform 206 real-time image post-processing for the individual layers 200 so that a quality of the first image 130 is modified to be more similar with a quality of the second image 132.

In an example embodiment, the binary segment mask may be post-processed in order to improve the composition quality. Similar to composition done for cinema material, a slight blurring of mask edges helps the composition look more seamless and also filtering may be used to reduce unwanted noise or to smooth the borders of the mask area. For example, OpenCV morphologic transformations provide filtering solutions for noise reduction and border smoothing. In order to enable mask blurring and filtering operations, the mask may be converted from binary image to a grayscale image with 8 bits of data per pixel.

In an example embodiment, to match the image quality of the RGB image provided by the RGB-D sensor with the image quality of the other image source, various real-time image post-processing effects may be used. Image post-processing effects (adjust histogram, blur, sharpen, add noise, adjust color balance, etc.) may be added to the segment layer in order to make the image 130 quality to match the image quality of the image source 132 to which the RGB-D data is being composited to.

In an example embodiment, the rendering 160 comprises: render each individual layer 200 of the first image 130 on top of the second image 132 as a background so that the individual layer with the biggest depth value is rendered first, and the rest of the individual layers are rendered according to their order, wherein the first depth information is compared with the second depth information and pixels of the individual layer are only drawn if their per-pixel first depth information is lower than the second depth information.

Each layer 200 may be rendered as a one rendering step on top of the image 132 used for the background. When rendering each segment layer 200, the depth data from both image sources are compared and pixels from the segment layer 200 are only drawn if they have lower depth value. This enables correct occlusions to occur between different image sources 130, 132.

FIG. 10 shows the composite image 134, in which the woman 502 is the detected region of the interest in the first image 130, and she 502 has been drawn on top of the men 600 and the background 602 from the second image 132.

Even if the example embodiments are described for single images 130, 132, a set of successive image processed in this way may form a video stream. The example embodiments may also be used to combine RGB-D sensor data of the first image 130 with a data captured from another RGB-D sensor or any other still or video image source 132 whose depth data is known. This includes video material captured by a normal camera in combination with some kind of depth camera, video captured with a stereo camera pair, real-time 3D graphics, etc.

Also, the processing described may be applied with some limitations with material captured and masked with traditional chroma keying or background subtraction image sources. In these cases, the depth of the captured area is defined to be at some constant distance, but it may still be composited together with more complex image sources, or even with another image source produced with traditional chroma keying/background subtraction using viewpoint and perspective compensation applied as described in the example embodiments.

Compositing element from one image source 130 to another 132 with the described processing may require at least some level of element detection to enable correct segmenting. In addition to directly segmenting detected elements and compositing them to another image source, based on the element detection, it may also be possible to add a further processing phase, where detected elements are modified/replaced with 3D rendering tuned to match the element location and orientation. For example, when detecting humans from the RGB-D data of the first image 130, it is possible to detect kinematic pose of the human's skeleton, which in turn may be used to drive a pose of virtual character or additional 3D elements that may be rendered and composited to the another image source 132. Such replacement and addition of 3D rendered element enables even more flexibility to what kind of image sources 130, 132 may be used and use cases that the described processing may be applied to.

In the described example embodiments, the exact method how the variation between viewpoints, perspective and depth values between the different image sources 130, 132 is solved, is not defined nor is it so relevant. An example embodiment, described so far is to define parameters associated to the image source 130, 132 variations is approximating them by a user operation. However, the processing is by no means limited to cases where the parameters are defined by a user operation, but any method for automatically detecting these variations between the image sources 130, 132 may be applied without any modifications required to the described processing. There are some existing solutions and on-going research work in the area of viewpoint and perspective detection from the images 130, 132, and any of the existing solutions may easily be adopted here. One recent example of such work is presented in the following publication:

Fidler, Sanja, Sven Dickinson, and Raquel Urtasun. "3d object detection and viewpoint estimation with a deformable 3d cuboid model." Advances in Neural Information Processing Systems. 2012.

The described example embodiments allow real-time composition of a wider range of different kinds of image data sources 130, 132 with correct handling of occlusions, perspective and image quality. This in turn enables creation of new kinds of immersive and engaging digital experiences for end users: digital signage solutions, interactive advertisement, public screens, amusement park installation, museums, education, etc. In an example embodiment, a prototype is integrated with a museum demonstrator, where a viewer 130 of a historical photograph is augmented as a part of the historical photograph 132 in a composite image 134 the viewer is seeing on a large display.

In an example embodiment, also illustrated in FIG. 2, a method performed in an electronic apparatus is provided. The operations are not strictly in chronological order, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

The method starts in 220.

In 150, a first image with first depth information is obtained.

In 152, a second image with second depth information is obtained.

In 154, regions of interest are detected in the first image.

In 154, the regions of interest are segmented into individual layers.

In 158, image compensation is performed for the individual layers according to the first depth information so that in image compensated individual layers a perspective and/or a viewpoint of the first image is modified to be more similar with the second image.

In 160, the image compensated individual layers are rendered with the second image utilizing the first depth information and the second depth information in order to produce a composite image.

The method ends in 222, or, as illustrated by the reference numeral 224, the operations may be performed recursively (in order to implement video processing, for example).

The already described example embodiments of the apparatus 100 may be utilized to enhance the method with various further example embodiments. For example, various structural and/or operational details may supplement the method.

It will be obvious to a person skilled in the art that, as technology advances, the inventive concept can be implemented in various ways. The invention and its embodiments are not limited to the example embodiments described above but may vary within the scope of the claims.

The invention claimed is:

1. An apparatus comprising:
one or more processors; and
one or more memories including computer program code, the one or more memories and the computer program code configured to, with the one or more processors, cause the apparatus at least to:
obtain a first image with first depth information;
obtain a second image with second depth information;
detect regions of interest in the first image;
segment the regions of interest into individual layers;
perform image compensation for the individual layers according to the first depth information so that in image compensated individual layers a perspective and/or a viewpoint of the first image is modified to be more similar with the second image; and
render the image compensated individual layers with the second image utilizing the first depth information and the second depth information in order to produce a composite image;
wherein the image compensation comprises performing a scaling and translation for the individual layers so that their distance from a camera that produced the first image is adjusted to match a perspective of the second image; and
wherein the scaling and translation comprises defining the nearest individual layer and the farthest individual layer with a user operation or according to a field of view of the camera that produced the first image, and defining for each individual layer the scaling and translation by interpolating scaling and translation values according to the distances between the individual layers.

2. The apparatus of claim 1, wherein the first image comprises for each pixel RGB color model levels and depth values.

3. The apparatus of claim 1, wherein the segmentation comprises ordering the individual layers according to their average first depth information.

4. The apparatus of claim 1, wherein the segmentation comprises cropping a minimum bounding box area surrounding the region of the interest with a binary mask layer, which defines pixels of the bounding box area as either belonging to the region of the interest or to a background or an occluding object.

5. The apparatus of claim 1, wherein the image compensation comprises:
performing an image warping for the individual layers so that a tilting of a geometry of the first image is modified to be more similar with a tilting of a geometry of the second image; and
performing a gradient depth correction for the individual layers so that a correction value is added to the first depth information in order to gradually change according to a direction of the image warping.

6. The apparatus of claim 1, wherein the image compensation comprises performing mask blurring and/or noise reducing filtering and/or border smoothing filtering for the individual layers.

7. The apparatus of claim 1, wherein the image compensation comprises performing real-time image post-processing for the individual layers so that a quality of the first image is modified to be more similar with a quality of the second image.

8. The apparatus of claim 1, wherein the rendering comprises rendering each individual layer of the first image on top of the second image as a background so that the individual layer with the biggest depth value is rendered first, and the rest of the individual layers are rendered according to their order, wherein the first depth information is compared with the second depth information and pixels of the individual layer are only drawn if their per-pixel first depth information is lower than the second depth information.

9. A method comprising:
obtaining a first image with first depth information;
obtaining a second image with second depth information;
detecting regions of interest in the first image;
segmenting the regions of interest into individual layers;
performing image compensation for the individual layers according to the first depth information so that in image compensated individual layers a perspective and/or a viewpoint of the first image is modified to be more similar with the second image; and
rendering the image compensated individual layers with the second image utilizing the first depth information and the second depth information in order to produce a composite image;
wherein the image compensation comprises performing a scaling and translation for the individual layers so that their distance from a camera that produced the first image is adjusted to match a perspective of the second image; and
wherein the scaling and translation comprises defining the nearest individual layer and the farthest individual layer with a user operation or according to a field of view of the camera that produced the first image, and defining for each individual layer the scaling and translation by interpolating scaling and translation values according to the distances between the individual layers.

10. The method of claim 9, wherein the first image comprises for each pixel RGB color model levels and depth values.

11. The method of claim 9, wherein the segmentation comprises ordering the individual layers according to their average first depth information.

12. The method of claim 9, wherein the segmentation comprises cropping a minimum bounding box area surrounding the region of the interest with a binary mask layer, which defines pixels of the bounding box area as either belonging to the region of the interest or to a background or an occluding object.

13. The method of claim 9, wherein the image compensation comprises:
performing an image warping for the individual layers so that a tilting of a geometry of the first image is modified to be more similar with a tilting of a geometry of the second image; and
performing a gradient depth correction for the individual layers so that a correction value is added to the first depth information in order to gradually change according to a direction of the image warping.

14. The method of claim 9, wherein the image compensation comprises performing mask blurring and/or noise reducing filtering and/or border smoothing filtering for the individual layers.

15. The method of claim 9, wherein the image compensation comprises performing real-time image post-processing for the individual layers so that a quality of the first image is modified to be more similar with a quality of the second image.

16. The method of claim 9, wherein the rendering comprises rendering each individual layer of the first image on top of the second image as a background so that the individual layer with the biggest depth value is rendered first, and the rest of the individual layers are rendered according to their order, wherein the first depth information is compared with the second depth information and pixels of the individual layer are only drawn if their per-pixel first depth information is lower than the second depth information.

17. A non-transitory computer-readable storage medium comprising computer program code which, when loaded into an apparatus causes the apparatus at least to:
obtain a first image with first depth information;
obtain a second image with second depth information;
detect regions of interest in the first image;
segment the regions of interest into individual layers;
perform image compensation for the individual layers according to the first depth information so that in image compensated individual layers a perspective and/or a viewpoint of the first image is modified to be more similar with the second image; and
render the image compensated individual layers with the second image utilizing the first depth information and the second depth information in order to produce a composite image;
wherein the image compensation comprises performing a scaling and translation for the individual layers so that their distance from a camera that produced the first image is adjusted to match a perspective of the second image; and
wherein the scaling and translation comprises defining the nearest individual layer and the farthest individual layer with a user operation or according to a field of view of the camera that produced the first image, and defining for each individual layer the scaling and translation by interpolating scaling and translation values according to the distances between the individual layers.

18. The non-transitory computer-readable storage medium of claim 17, wherein the segmentation comprises cropping a minimum bounding box area surrounding the region of the interest with a binary mask layer, which defines pixels of the bounding box area as either belonging to the region of the interest or to a background or an occluding object.

19. The non-transitory computer-readable storage medium of claim 17, wherein the image compensation comprises:
performing an image warping for the individual layers so that a tilting of a geometry of the first image is modified to be more similar with a tilting of a geometry of the second image; and
performing a gradient depth correction for the individual layers so that a correction value is added to the first depth information in order to gradually change according to a direction of the image warping.

20. The non-transitory computer-readable storage medium of claim 17, wherein the rendering comprises rendering each individual layer of the first image on top of the second image as a background so that the individual layer with the biggest depth value is rendered first, and the rest of the individual layers are rendered according to their order, wherein the first depth information is compared with the second depth information and pixels of the individual layer are only drawn if their per-pixel first depth information is lower than the second depth information.

* * * * *